Sept. 14, 1948.  N. B. WALES  2,449,186

SELF-OPENING CONTAINER

Filed Feb. 17, 1945

INVENTOR.

Patented Sept. 14, 1948

2,449,186

UNITED STATES PATENT OFFICE 2,449,186

SELF-OPENING CONTAINER

Nathaniel B. Wales, New York, N. Y., assignor, by mesne assignments, to Industrial Patent Corporation, New York, N. Y., a corporation of New York Application February 17, 1945, Serial No. 578,451

10 Claims. (Cl. 220—47)

This invention relates to a container for food, or the like, and its main object is to quickly open a hermetically sealed can without physical effort, and is equivalent to the conventional tin can so widely used in the packaging of food.

To achieve this object, I utilize the pressure generated by a volatile fluid sealed in a closed chamber incorporated in the cover of the can. The increase of pressure in such a chamber formed in the cover of the can, after the temperature of the volatile fluid has risen to a predetermined degree, expands the initial volume of the chamber, producing by such expansion the resolution of forces as are present in the mechanical movement of the conventional toggle, thereby causing a relatively great disruptive force to be applied directly to the soldered joint hermetically sealing the cover of the can, and so disrupting this joint by this movement, that the cover is entirely free from the body of the can.

A further object of my invention is to so construct the chamber containing the volatile fluid, that its deformation from pressure generated by the volatile fluid will not occur to any appreciable degree until the temperature of the fluid has risen to a pre-determined temperature. For this reason if the can is stored in a warehouse in hot weather, or other equivalent temperature conditions, the joint hermetically sealing the can will not be disrupted or broken.

To this end, I attach the two discs forming the chamber containing the volatile fluid by spot-welds of predetermined cross section and number, so positioned between the walls of the chamber that the deformation of the wall is minimized until the spot-welds are abruptly disrupted under a pressure generated at a pre-determined point of temperature. This is practically possible for at the present state of the art in spot-welding, where such welding is effected under automatic thryatron control, the cross section and metallurgical structure of such a weld is so precise that its tensile strength can be very accurately pre-determined.

Other objects and details will be more specifically described in the following specifications and drawings which illustrate an embodiment of my invention in which.

Referring to the several drawings, similar numerals refer to similar parts.

Figure 1:
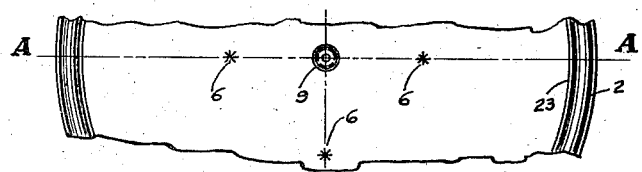
Figure 1 is a fragmentary view in plan of the container showing in particular the spot-weld points thereon.
Figure 2:
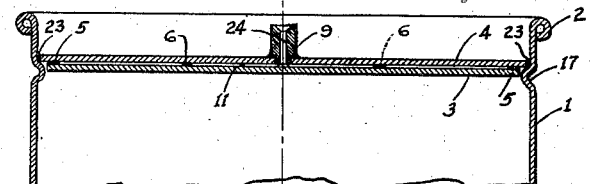
Figure 2 is a section in elevation taken on line AA in Figure 1 of the container before the chamber in the cover had been charged with fluid.

In Figure 2, numeral 1 is the body of the container, the top end of which may terminate in a rolled edge 2. The cover of the container is composed of two discs preferably of metal, a lower one 3 of slightly less diameter than the upper one 4. These two discs are seam-welded together at their approximate peripheries indicated by numeral 5. The upper disc 4 preferably is soldered at its periphery 23 to the inside circumference of the container 1 just above and preferably resting on the in-turned edge of the bead 17 shown as rolled in to the container body 1. Individual spot-welds of accurate cross-section, and pre-determined as to their tensile strength, are shown in Figures 1 and 2 by numeral 6, and are shown after being disrupted, in Figure 3 by numeral 6a. Numeral 7 is the bottom of the container; and is shown with the conventional tin can double folded crimped lock 8 securing the bottom 7 to the container body 1.

A combined filler element and fluid seal 9, see Figures 1 and 2, is made preferably of relatively soft metal, and is suitably secured into and through the upper disc 4, so that the orifice 24 in element 9 communicates with the relatively small space 11 between discs 3 and 4.

Figure 3:
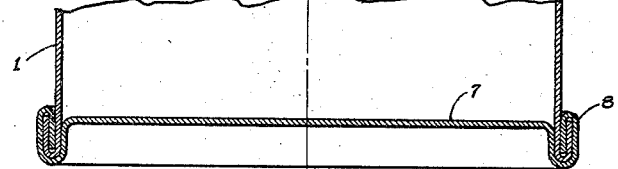
Figure 3 is also an elevation of the container partially in section on line A—A in Figure 1 showing the cover of the container after being exposed to a pre-determined "opening" temperature and its consequent deformation and the hermetical seal between the cover and the container ruptured.

In Figure 3 element 9a, shown in Figures 1 and 2 as 9, has been squeezed together by a suitable forming tool, to seal the few drops of volatile fluid injected therethrough and into space 11, after the filling, exhausting, sealing, processing and cooling operations as are conventionally carried out in the typical commercial canning operation.

The operation of my self-opening container is as follows: After the can, or container, is filled with its contents, the cover composed of the two discs 3 and 4, having been previously hermetically seam-welded together at their peripheries 5 and suitably spot-welded together at points 6 are, as a cover unit, soldered into the inside of the container at and around the inside circumference of the container 1 at 23. It is to be noted that the filler element 9 is still open as shown in Figure 2.

After the cooling process in the sequence of canning operations, the container comes under a volatile fluid filling station, and a pre-determined amount of fluid is injected through the orifice 24, entering the space 11 between the discs 3 and 4, and a forming tool closes orifice 24, thereby sealing within the space 11 between discs 3 and 4 the volatile fluid. The can is then labeled and ready for shipment.

When it is desired to open the container, the top of the can or container is held under the hot water faucet, or boiling water from the tea kettle is poured on the top of the can, or other forms of heat application are applied thereto.

At this point it may be said that the volatile fluid "Freon 21" is suitable to use in this invention as the operative fluid as heretofore described. If the hot water poured on the top of the can heats this volatile fluid to a temperature of 134 degrees F. by referring to the saturate vapor pressure table for "Freon 21," a pressure of 54 pounds gauge per square inch has been generated in space 11 and the spot-welds 6 predetermined as to their number, disposition and cross sections, are disrupted at this pressure. Then the discs 3 and 4, now unsupported, bulge out as is shown in Figure 3 by numerals 3a and 4a, see figure.

Figure 5:
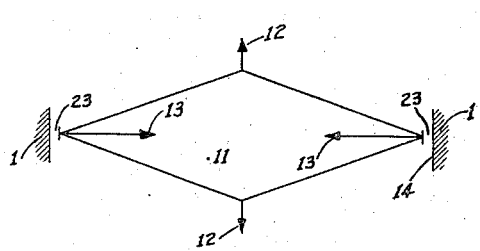
Figure 5 is a force-diagram represented in a toggle mechanical movement which approximates the rupturing action set up on the hermetical seal between the cover and the can when the fluid chamber in the cover deforms under pressure.

Referring to the force-diagram, Figure 5, the arrows 12 indicate the pressure as generated by "Freon 21" as applied against the interior surface of discs 3 and 4, and by reason of the mechanics of a toggle movement, arrows 13 in Figure 5 indicate the inwardly directed force tearing apart the soldered joint 23, which sealed the cover to container 1. The soldered joint 23, see Figure 2 is disrupted by this relatively great force and the cover of container 1 is entirely freed from container 1, as is shown in Figure 3 by numeral 15.

If the combined area of discs 3 and 4, within the periphery of seam-weld 5 is eight square inches, a force of approximately 432 pounds is applied to the internal area of discs 3 and 4 and creates, through the toggle-like action, the severance of soldered joint 23. If 180 degrees F. is taken as the critical "opening" temperature the saturate vapor tables for "Freon 21" show a force of 840 pounds available to produce the necessary distortion.

Figure 4:
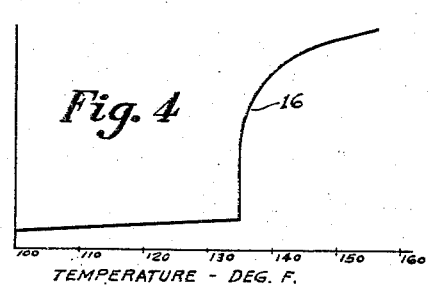
Figure 4 is an approximate curve representing the degree of deformation of the chamber-cover of the container, as and when, the cover has attained the temperatures as indicated.

Referring to Figure 4 the delayed action, as regards critical distortion of the discs 3 and 4, comprising the cover, is shown graphically therein. It is not assumed that this is an exact curve, but will serve to illustrate this action. Furthermore, the assumption that each cover charged with the volatile fluid will open at exactly the same temperature is not to be made. A variation of ten to twenty degrees in the "opening" temperature will not destroy the utility of the container, provided this variation in temperature occurs at a higher temperature than the container would in all ordinary circumstances, encounter in transit or storage before use. It should also be noted that after the cover is freed from the container no escape of the volatile fluid in a gaseous or liquid state occurs.

Figure 6:
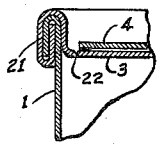
Figure 6 is an alternate cover construction shown in section as a fragment of Figure 2 in which the cover is secured to the can by the conventional crimped seam as shown in Figure 2, but a deep scored-in ring in the cover of the can is ruptured by the deformation of the cover instead of the deformation rupturing the soldered joint as in Figure 3.

Referring to Figure 6, this illustrates a modification of my invention in that I substitute a scored-in circular ring 22 in the lower disc 3 for the soldered joint 23 in the upper disc 4 as is shown in Figures 1, 2 and 3. I also show in Figure 6 the identical type of lock to hold disc 3 to the container 1 as is used to secure the bottom 7 to the container 1 in Figures 1, 2 and 3. Otherwise the operation and "opening" action is entirely similar to that already described. When the spot-welds 6 are disrupted and discs 3 and 4, composing the cover, are distorted as in Figure 3, the circular scored-in ring 22 in disc 3, weakened to a pre-determined degree by the scoring therein, is ruptured and the top of the container 1 is free from the container body.

What I desire to protect by United States Letter Patent is encompassed in the following claims:

1. A closure for containers adapted to self-open by the application of heat thereto when hermetically sealed at its periphery to a container, said closure comprising metal plates hermetically sealed to each other at their periphery, said plates forming a normally collapsed expansible chamber, and gaseous generating means incorporated within the chamber for moving the plates apart and expanding the chamber, whereby said plates are moved with respect to the seal between said closure and the container to which said closure is applied to constrict the periphery and thereby disrupt said seal.

2. A closure for containers adapted to self-open by the application of heat thereto when hermetically sealed at its periphery to a container, said closure including a metal plate having an enclosing line of severance in the body thereof, and that portion of said closure within said line of severance having an additional metal plate sealed at its periphery to the first named plate and forming therewith a normally collapsed expansible chamber, and means incorporated within said chamber for moving the plates apart and expanding the chamber, whereby said plates are moved transversely of the plane of the closure to thereby distort the closure at a point adjacent to said line of severance between said closure and the container to which it is applied and in order to rupture said line of severance.

3. A hermetically sealed container opened by the application of heat thereto, comprising a closure therefor, formed of a plurality of flexible metal plates hermetically sealed to each other at their periphery, the periphery of said closure being sealed to the container, said plates so sealed forming a normally collapsed expansible chamber, and a substance within said chamber and capable of generating gaseous pressure within the chamber, when subjected to heat, said pressure when so generated within the chamber acting to expand the plates of said chamber transversely of the plane of the closure to thereby distort the closure at a point adjacent the seal between said closure and the container to disrupt said seal.

4. A hermetically sealed container, opened by the application of heat thereto, comprising a cover therefor, formed of two discs, one larger than the other, the smaller one seam-welded at its circumference to the larger one, and means to inject and seal therebetween a volatile fluid, a hermetical seal formed around the circumference of said larger disc and said container, pressure responsive to a rise in temperature of said volatile fluid for deforming said discs, and means actuated by the deformation of said cover to sever said hermetical seal.

5. A hermetically sealed container, opened by the application of heat thereto, comprising a cover therefor, formed of two discs seam-welded circumferentially one to the other, to form a chamber therebetween, and means to inject and seal in said chamber a volatile fluid, a hermetical seal formed around the circumference of one of said discs, exterior to said chamber, sealing said container, and a scored ring section formed in said disc between the seam-weld therein and the seal made with the container, pressure responsive to a rise in temperature of said volatile fluid for expanding said chamber, and means actuated by the expansion of said chamber to sever said scored ring section in said cover.

6. In a hermetically sealed container, means capable of opening said container on the elevation of the temperature thereof, comprising a cover for said container, sealing means to secure said cover to said container, a chamber formed in said cover, a volatile fluid in said chamber, pressure responsive to a rise in temperature of said volatile fluid, for distorting said chamber thereby to unseal said sealing means, and rupturable means for inhibiting said distortion until a predetermined value of pressure is developed in said chamber by said volatile fluid.

7. A hermetically sealed container opened by the application of heat thereto, comprising pressure generating fluid means, incorporated within a chamber formed in the cover of said container, support means within said chamber to restrict the deformation of said chamber until a predetermined pressure has been generated therein, and means actuated by said deformation to sever said cover from said container when said pressure within said chamber ruptures said support means, and permits said chamber incorporated in said cover to deform.

8. A hermetically sealed container, opened by the application of heat thereto, comprising a cover therefor, formed of two discs, one larger than the other, the smaller one seam-welded at its circumference to the larger one, and means to inject and seal therebetween a volatile fluid, a hermetical seal formed around the circumference of said larger disc and said container, and bonded means incorporated between said two discs to maintain said discs in an approximately normal position, until the pressure generated by said volatile fluid reaches a predetermined pressure, and said pressure ruptures said bonded means, and permits said discs to deform by said predetermined pressure, and means actuated by the deformation of said cover to sever said hermetical seal.

9. A hermetically sealed container, opened by the application of heat thereto, comprising a cover therefor, formed of two discs, one larger than the other, the smaller one seam-welded at its circumference to the larger one, and means to inject and seal therebetween a volatile fluid, a hermetical seal formed around the circumference of said larger disc and said container, and a scored ring-section formed in the larger disc, between said seam-weld on the smaller disc and said hermetical seal made with the container, and bonded means incorporated between said two discs to maintain said discs in an approximately normal position until the pressure generated by said volatile fluid reaches a predetermined pressure and said pressure ruptures said bonded means and permits said discs to deform under said predetermined pressure, and means actuated by said deformation to sever said scored ring section in said cover.

10. A hermetically sealed container, opened by the application of heat thereto, comprising a cover therefor, formed of two discs seam-welded circumferentially one to the other, to form a chamber therebetween, and means to inject and seal in said chamber a volatile fluid, a hermetical seal formed around the circumference of one of said discs, exterior to said chamber, sealing said container, and a scored ring section formed in said disc between the seam-weld therein and the seal made with the container, and bonded means incorporated between said two discs, within said chamber, to maintain said discs in an approximately normal position until the pressure generated by said volatile fluid in said chamber attains a predetermined pressure, and said pressure breaks said bonded means and permits said discs to deform, and means actuated by said deformation, to sever said scored ring section in said cover.

NATHANIEL B. WALES.

REFERENCES CITED

The following references are of record in the file of this patent:

UNITED STATES PATENTS

| Number | Name | Date |
|---|---|---|
| 2,347,976 | Trapp et al. | May 2, 1944 |
| 2,296,848 | Gueffroy | Sept. 29, 1942 |
| 2,336,490 | LoVico | Dec. 14, 1943 |
| 2,372,331 | LoVico | Mar. 27, 1945 |
| 2,383,274 | Punte | Aug. 21, 1945 |